June 2, 1953 R. E. CRAVEN 2,640,677
VALVE AND SEAT FOR SLUSH PUMPS
Filed Nov. 2, 1946
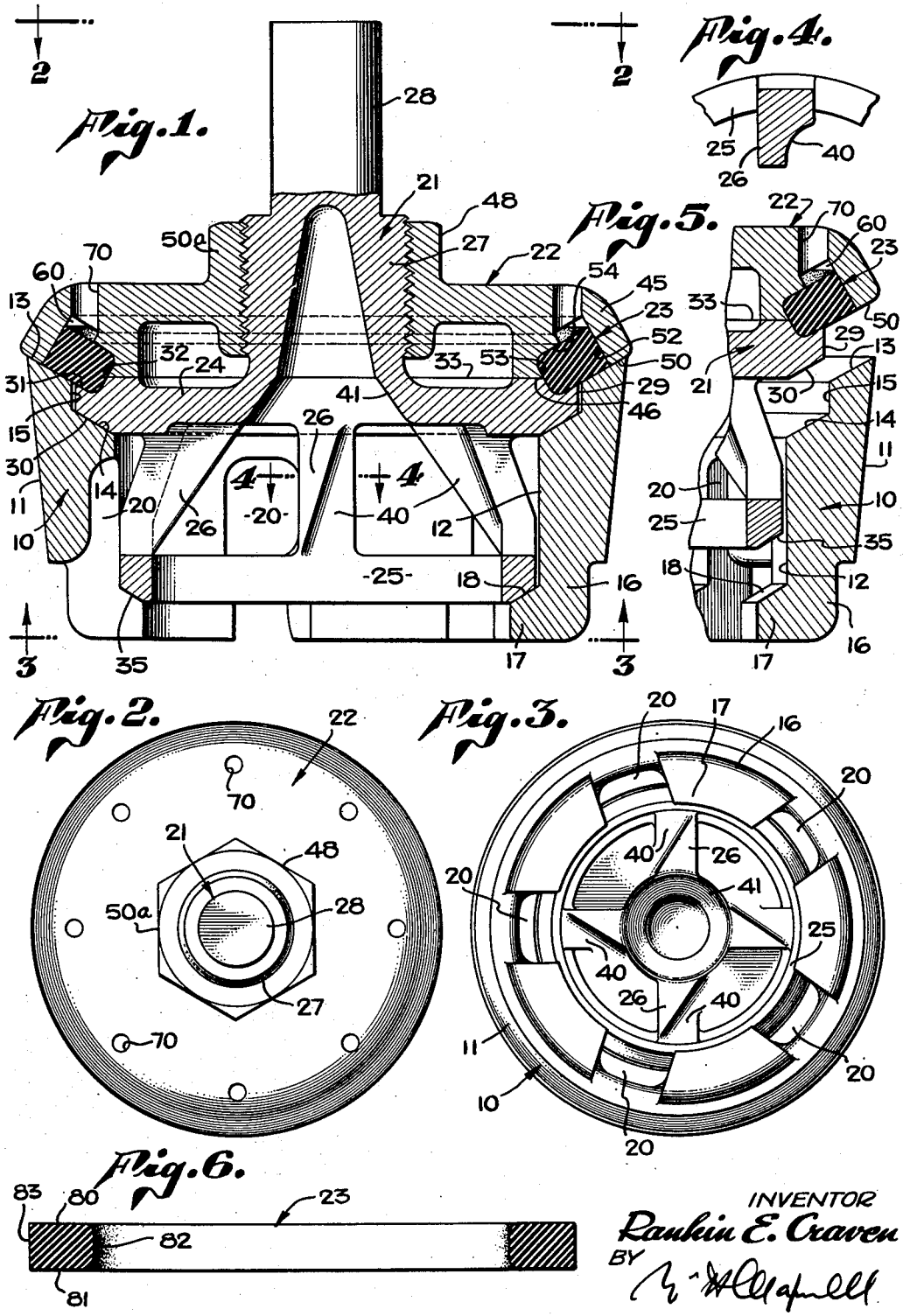
INVENTOR
Rankin E. Craven
BY
ATTORNEY Patented June 2, 1953

2,640,677

UNITED STATES PATENT OFFICE 2,640,677

VALVE AND SEAT FOR SLUSH PUMPS

Rankin E. Craven, Whittier, Calif.; Ella Craven, administratrix of said Rankin E. Craven, deceased Application November 2, 1946, Serial No. 707,410

11 Claims. (Cl. 251—127)

This invention has to do with a valve and seat for slush pumps, or the like, and it is a general object of the invention to provide a simple, practical and improved valve and seat that will work dependably and efficiently under high pressures and severe working conditions.

Slush pumps are used under varying conditions and as used in the oil fields they are subject to severe working conditions and they frequently operate under high pressure and handle fluids that are sandy or which contain foreign matter. In the case of pumps used in oil fields there is a definite trend toward the use of large pumps requiring valves of large diameters and there is a trend toward the use of high pressures. Ordinary valve and seat construction usually employed in slush pumps work satisfactorily in smaller sizes and under lower pressures, but frequently are unsatisfactory or fail when made in large sizes or when subjected to very high pressures.

It is a general object of this invention to provide a valve and seat construction for slush pumps which can be economically and practically constructed in large sizes to give highly efficient and dependable service under very high working pressures.

A general object of the present invention is to provide a valve and seat wherein the seat has a bottom supporting shoulder spaced well below the sealing parts of the valve and seat while the valve has a disc-like body the periphery of which is sealed with the seat while the center portion is braced by legs that depend to a base ring which is supported by the shoulder of the seat. Through my construction I provide a valve member with a disc-like body which when under load is supported at its periphery by the seat and is also braced or supported at its center portion so that it does not dish or spring in even under very high pressures.

Another object of the present invention is to provide a valve and seat having a plurality of spaced cooperating parts through which load or pressure is transmitted from the valve to the seat, the said parts being spaced axially of the structure as well as radially thereof.

A further object of this invention is to provide a valve member operable in an annular seat and having a disc-like body and a base ring supported concentrically of the body a substantial distance below the body to act both as a guide and as a means of supporting the valve from the seat.

Another object of this invention is to provide an annular seat free of central valve guiding parts and webs or ribs supporting such parts and characterized by circumferentially spaced axially extending channels in its inner wall serving to conduct fluid so that flow velocity and consequent wear are minimized.

It is a further object of this invention to provide a valve of the character referred to with a disc-like body having a central recess or flow cushion chamber in its bottom or lower side. With my construction the chamber or pocket provided in the bottom of the valve has the action of a bull plug with the result that wear of the valve is minimized.

It is a further object of the present invention to provide a valve of the general character referred to having pitched surfaces preferably on the legs which support the base ring so that flow through the valve causes it to rotate in the seat. By causing the valve to rotate or creep around in the seat as it operates cutting or pitting of the cooperating parts is minimized.

A further object of the invention is to provide a sealing ring retained in the valve so that it cannot be blown out or dislodged during operation. With my construction the ring is confined by the sections of the valve so that there are retaining parts at its several sides making it impossible for the ring to become displaced except when the sections are separated. In the preferred construction the ring is rectangular in cross sections of the valve have parts effectively engaging and supporting all four sides of the ring.

A further object of the present invention is to provide a valve of the general character referred to having a sealing ring with a sealing portion free to be held against the seat by fluid pressure and unconfined to the extent that it can lift or push away from the seat in the event that foreign matter becomes lodged between the valve and the seat.

It is a further object of the present invention to provide a valve of the character referred to involving a sealing ring so confined by the sections of the valve that it does not spread or distort during operation or when subjected to fluid pressure that acts to hold it in sealing engagement with the seat.

The various objects and features of my invention will be fully understood from the following detailed description of a typical preferred form and application of my invention, throughout which description reference is made to the accompanying drawings, in which:

Fig. 1 is a longitudinal vertical sectional view of the valve and seat construction of the present invention showing the valve closed or in seating engagement with the seat. Fig. 2 is a top view of the structure shown in Fig. 1, being a view taken as indicated by line 2—2 on Fig. 1. Fig. 3 is a detailed bottom view taken as indicated by line 3—3 on Fig. 1. Fig. 4 is a sectional view of a portion of the structure shown in Fig. 1. Fig. 5 is a sectional view of a portion of the structure shown in Fig. 1, showing the relationship of the parts when the valve is open or away from the seat, and Fig. 6 is a sectional view of the sealing ring showing the manner in which it is initially formed, that is, showing the shape that it is in before being applied to the valve as illustrated in Fig. 1.

The structure that I have provided involves both a valve and a seat and since my construction is particularly useful in slush pumps or the like I have shown these parts in a form or of a design applicable to the usual slush pump. Since the usual slush pump has a valve chamber with a tapered seat receiving opening I have shown the seat tapered to fit such an opening, and since the usual slush pump has guide means for the valves employed therein I have shown the valve with the usual guide stem projecting upwardly therefrom.

The seat of the structure is a simple annular element free of central valve guides and the webs, ribs, or other parts usually incidental to such guides. In its preferred form the seat has an annular main portion or body 10 having a finished and suitably tapered outer surface or wall 11 to fit and seat receiving opening of a pump chamber. The inner surface or wall 12 of the body is preferably straight or parallel with the longitudinal axis of the body and as will be hereinafter described it forms a guideway for the base ring of the valve. The body 10 has a beveled or inclined top that opposes the valve and which extends downwardly and inwardly and is stepped so that it has an outer portion 13 adjoining and extending downwardly and inwardly from the top edge of wall 11 and an inner wall portion 14 extending upwardly and outwardly from the upper edge of wall 12. The seat portions 13 and 14 are preferably inclined or pitched at substantially the angle illustrated in Fig. 1, and in the preferred form of the invention are parallel or are in parallel planes thereof spaced apart vertically or longitudinally of the structure. The seat portions 13 and 14 are preferably of about equal extent or width, as shown in Fig. 1 and are joined by a straight or axially disposed wall 15. The structure just referred to, in effect provides a top and outer seating surface 13 and a counterbore extending into the seat from its upper end establishing the longitudinal wall 15 and an inner and lower seating surface 14 at the bottom of the counterbore.

My present construction provides a skirt 16 depending from the lower end of body 10 so that it is, in effect, a downward continuation of the body though it is preferably somewhat smaller in diameter than the lower end of the body, as shown in Fig. 1 of the drawings. The skirt extends a suitable distance downward from the body and is provided at its lower end with an inwardly turned or projecting lip 17 the top of which forms a seat for the base ring of the valve. I prefer to bevel or pitch the top of the lip 17 so that it forms a downwardly and inwardly inclined seat 18 for the base ring of the valve, and I may pitch the seat 18 at the same angle as I pitch the seat portions 13 and 14. Through the construction just described the seat element of the structure is provided not only with the inner and outer seats at the upper portion of the body but with a third seat 18 which is spaced a substantial distance below the upper end of the body and is inward of both seat portions that are located at the upper end of the body.

In accordance with the preferred form of my invention I provide the seat element of the structure with a plurality of circumferentially spaced axially disposed channels 20 which increase the capacity of the seat by increasing the cross sectional area of the flow passage through the seat at the portion thereof where the channels occur. In accordance with the preferred form of my invention the channels extend upward from the lower end of the seat element, that is from the lower or bottom end of the depending skirt 16 and its lip 17 to a point immediately below the inner edge of the inner seat part 14. Where the channels occur in the body 10 they are confined to the inner side or wall 12 thereof leaving the outer side 11 continuous and uninterrupted. In the case illustrated the channels are shown cut completely through the skirt 16 and its lip 17 so that the skirt is, in effect, divided circumferentially into a plurality of spaced sections. It will be apparent from Fig. 1 of the drawings how the channels serve to admit a substantial amount of fluid into the throat of the valve element which occurs immediately adjacent the inner seat portion 14 so that the entire flow does not have to enter through the opening that would be otherwise defined by the lipped skirt 16.

If it were not for the channels 20 the lipped skirt of the seat element would form a slight restriction to flow since the opening at the lip 17 is smaller in diameter than at the point where the inner seat portion 14 joins the inner side 12 of the body. By providing a suitable number of channels 20 and by making them of sufficient size the intake capacity of the seat element is greatly increased, with the result that fluid velocity through the seat up to the throat of the valve element is reduced with consequent minimization of wear.

The valve proper, that is, the valve element of the structure that cooperates with the seat that I have just described, involves three parts or sections, a main section 21, a cap section 22 and a sealing ring 23.

The main section involves, generally, a disc-like body 24, a base ring 25, circumferentially spaced legs 26 depending from the body and supporting the ring, a boss 27 projecting upwardly at the center of the top of the body and a stem 28 projecting upwardly from the boss.

The body 24 of the main section may be in the form of a flat disc or round flat plate lying in a plane normal to the longitudinal axis of the structure and having an outer or peripheral edge wall 29 fitting the counterbore at the top end of the seat element with suitable working clearance, that is, fitting into the seat to suitably clear the wall 15 that occurs between the outer and inner seat portions 13 and 14. The outer lower corner of the body is dressed away forming an inclined or beveled face 30 to seat or bear upon the inner seat portion 14 of the seat element and the parts are preferably proportioned or related so that the seating face 30 of the body 24 is of substantially the same width or extent as the inner seat portion 14, as clearly shown in Fig. 1 of the drawings. The upper outer corner of the body 24 is notched so that it has what I will term a bottom wall 31 in a plane parallel to and preferably coincidental with the outer seat surface 13 of the seat element, and a wall 32 which I will term a side wall normal to the wall 31. The bottom wall 31 of the notch extends outward to and joins the top edge of the peripheral wall 29 while the side wall 32 joins the top surface 33 of the body. The top surface 33 at the point where it is joined by the wall 32 is preferably finished to form a support for the cap section 22.

The base ring 25 is concentric with the body 24 and is spaced a substantial distance below the body. The ring is somewhat smaller in diameter than the body so that it fits within the inner wall 12 of the seat with suitable working clearance. Since one of the functions of the ring is to guide the valve in the seat the ring is made to have a guiding fit in the body of the seat element. The lower outer corner of the ring 25 is dressed or beveled away to form a seating face 35 that rests upon the seat 18 or lip 17 when the valve is closed.

The legs 26 serve to support the ring 25 from the body 24 and in accordance with my invention they join or are integrally connected with the lower side of the body 24 near or at the center portion thereof, and they extend downwardly and outwardly to the ring 25 where their outer ends are joined to the ring, preferably integrally joined thereto. In practice the legs are made as light as possible consistent with strength and rigidity and I prefer to employ a minimum number of legs. In the design illustrated there are four legs 26. By joining to or extending from the central portion of the body 24 the legs serve as props or supports for this portion of the body with the result that when the valve is closed, as shown in Fig. 1, the body 24 is held against bowing or cupping inwardly at the center since forces tending to thus bow or cup the body are communicated through the legs 26 to the ring 25 which, in turn, is supported by the lipped skirt of the seat element.

In accordance with the preferred form of my invention I shape the legs 26 so that they are vane-like parts, that is, I preferably form each leg with an inclined or pitched surface 40 over which fluid flows when it passes through the valve so that it reacts on the valve to turn it somewhat in the seat element. In practice it is desirable to shape the legs substantially as shown in the drawings so that the valve moves slightly around in the seat each time it operates and consequently does not repeatedly seat in the same position.

The boss 27 is a centrally located projection on the top of the body 24 extending a suitable distance above the body 24 and forming a part to which the cap section is connected. The stem 28 projects upwardly from the top or upper end of the boss 27 so that it is concentric with the longitudinal axis of the structure and is shaped and proportioned to cooperate with a suitable valve guide in the pump structure in which the parts are employed.

In accordance with my present invention I provide a recess or chamber 41 in the main section of the valve from the lower end of the body portion 24 which chamber is preferably located centrally of the main section and is of substantial depth as shown in Fig. 1 of the drawings. In the case illustrated the chamber extends into or through the body 24 and well into or through the boss 27 on the top of the body. This chamber serves to lighten the construction and furthermore serves as a fluid cushion so that as fluid rushes through the valve it does not impinge upon the central portion of the body 24 but rather its flow and cutting action is retarded by fluid in the chamber 21, with the result that wear on the body is minimized.

The cap section 22 is a disc-like plate with a central hub 50a engaged with the boss 27 and with a peripheral portion of the rim 45. The disc-like portion of the cap is preferably located well above the body 24 of the main section while the rim 45 is in the nature of an enlargement the lower end of which is provided with a finished face 46 to rest or bear upon the top 33 of the body 24.

The hub portion of the cap section surrounds the boss 27 of the main section and, in practice, is suitably made fast or secure thereto. In the case illustrated the boss 27 is externally threaded while the hub 50a is internally threaded and these parts are engaged or threaded together as clearly shown in Fig. 1 of the drawings. A portion of the hub projects above the plate-like portion of the cap and its exterior is formed so that it is polygonal, that is, so that it has flat sides 48 to be conveniently engaged by a wrench or other like tool.

The enlarged rim portion 45 of the cap having its bottom face 46 resting on the top face 33 of body 24 has an outer or peripheral face 50 pitched or inclined the same as the seat portion 13 of the seat element and located to engage and rest upon the seat portion 13 when the valve is closed. The peripheral face 50 is narrower than the seat portion 13 and is confined to or located at the outer edge portion thereof.

An annular notch is formed in the ring portion between the face 46 and the face 50 which notch has an outer side wall 52 normal to the peripheral face 50, an inner side wall 53 adjoining the outer edge of face 46 and parallel with the outer face 52, and a bottom 54 parallel with face 50 and consequently normal to the walls 52 and 53. The inner wall 53 of the notch in the rim 45 is located to be in the plane of or to form a continuation of the side wall 32 of the notch in the peripheral portion of the body 24, with the result that when the valve sections are together, as shown in the drawings, the sealing ring 23 is confined between them so that it is engaged and held at all four sides.

An annular recess 60 is provided in the bottom 54 adjacent the side wall 52 to be opposite the outer seat portion 13 where the sealing ring engages the outer seat portion. The portion of the sealing ring 23 that engages the seat portion 13 is free to move either toward or away from the seat portion, although it is confined against outward expansion or spreading by the wall 52. A plurality of fluid passages 70 are provided in the rim portion 45 extending from the exterior of the rim portion to the recess 60 so that fluid pressure acting on the top of the valve is admitted to the sealing ring. The recess 60 is an annular recess extending completely around the sealing ring so that pressure admitted through the passages 70 acts to press the sealing ring against the seat portion 13 completely around the seat portion.

The sealing ring is an annular body of suitable sealing material such as rubber or rubber-like composition and, although it may be varied somewhat in cross sectional configuration without departing from the spirit of my invention, I prefer that it be substantially rectangular in cross section, as shown in the drawings. In practice it is advantageous to initially form the sealing ring so that it has flat parallel top and bottom walls 80 and 81 and flat inner and outer side walls 82 and 83 normal to the top and bottom, as clearly shown in Fig. 6. The sealing ring is proportioned to fit into or between the sections 21 and 22 of the valve and when it is in place between the sections it is somewhat distorted from the initial or normal shape, as shown in Fig. 6, so that its outer side 83 bears against the wall 52 while its inner side bears against walls 32 and 53 while the top 80 bears against wall 54 and the bottom 81 bears against wall 31.

With the ring thus confined between the sections 21 and 22 it is held or engaged at all four sides, except that it has a substantial portion of its bottom side 81 exposed or free to engage and seat against the outer seating portion 13 and it has a portion of its top side 80 opposite the said portion of the bottom side 81 at the recess 60 so that it is exposed to fluid pressure admitted through passages 70. It will be apparent that the sealing ring thus confined between the sections 20 and 21 cannot possibly become displaced therefrom, and yet the ring has a free or lip-like sealing portion located to advantageously engage and seal against the seat portion 13. It is significant to note that through my construction the exposed portion of the bottom side 81 of the sealing ring occurs in the corner defined or formed by the wall 29 and face 50 so that when the valve is open, as shown in Fig. 4, flow of fluid between the valve and seat is not allowed to directly impinge upon the sealing ring but is directed past it with the result that the ring does not cut out as does the sealing ring of the ordinary valve construction.

In employing the structure that I have provided, the seat element is made fast in the chamber of the pump and the valve element with the sections 21 and 22 tightly joined through the threaded connection and with the sealing ring held between them is arranged in the seat element. When the valve is closed, as shown in Fig. 1, the valve element is supported at three spaced points, these points being spaced radially and also axially. The cap section engages and is supported on the outer part of the seat portion 13. The body 24 engages and is supported on the inner seat portion 14 while the base ring 25 engages and is supported on the lipped skirt 16. When pressure comes on the valve tending to force it tight against the seat the several points of engagement effectively support the valve from the seat and the base ring and legs 26 effectively support the central portion of the valve body 24 which might otherwise tend to be deflected downwardly by pressure.

The seat ring 25 guided in the seat element effectively guides the valve as it opens and closes, and when the valve is open fluid is free to flow up through the seat ring and between the legs 26 and it is also free to flow up through the center of the seat element and also through the channels 20. As fluid passes out between the top of the seat element and the peripheral portion of the valve element it is effectively guided so that it does not strike the sealing ring in a manner to injure it.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. In combination, a seat element having an annular body with an outer mounting surface at its upper end portion, an upwardly facing seat at its upper end, a skirt depending from the body and a shoulder in the skirt, the seat having inner and outer portions, the outer portion being spaced above the inner portion and a valve including, a rigid disc-like part with a downwardly facing peripheral face engageable with the inner portion of the seat of the body, a sealing ring carried by said part above and outward of the said face and adapted to seal with the outer portion of the seat when the said face engages the inner portion of the seat, a base ring spaced below the body and guided by said skirt and engageable with the shoulder in the skirt when the face engages the seat of the body, and legs rigidly connecting the ring and the middle portion of said part, the legs having pitched surfaces engaged by fluid passing the valve to cause rotation of the valve relative to the seat element.

2. A pump valve including, a seat member having an annular body provided at its upper end with a first inwardly and downwardly inclined annular seat and a second inwardly and downwardly inclined annular seat inwardly and downwardly stepped from the first seat, a skirt depending from the body below said second seat, said skirt having channels therein extending longitudinally of the valve and forming a plurality of spaced skirt sections, a third inwardly and downwardly inclined annular seat inwardly and downwardly stepped from said second seat, and a valve member mounted in said seat member and including, a grooved cap having an inwardly and downwardly inclined face parallel with the first inwardly and downwardly inclined seat of said body and engageable therewith, and a groove plate member secured to the lower side of said cap, the grooves of the plate member and of said cap being in communication and forming an annular channel, a sealing ring substantially rectangular in cross section carried in said channel and having an exposed face parallel with and adapted to engage the first inwardly and downwardly inclined seat of said body and substantially in the plane of the inwardly and downwardly inclined face of said cap, there being an inwardly and downwardly inclined surface on said plate member inwardly and downwardly stepped from the inwardly and downwardly inclined face of said cap and parallel with the said second seat of said body and engageable therewith, legs depending from said plate member and into the body of the seat member, and a ring carried by said legs within the body of the seat member and having an inwardly and downwardly inclined face above and parallel with said third seat of said body and engageable therewith when the said other faces and seats are engaged, the spaces between said legs being in communication with said channels forming fluid passages into the body of the seat member between said second seat and said third seat, and said legs having inclined impeller surfaces adapted to be engaged by fluid flowing upwardly through the valve.

3. In combination, a seat element adapted to be carried by an apertured support and having an annular body with an outer mounting surface adapted to seat in the apertures of the support, said element having a seat at its top end and having a skirt with flow passages therethrough and depending below the mounting surface, the skirt having an internal upwardly facing shoulder, a valve including, a rigid disc-like part with an outer peripheral face engageable with the seat of the body, and a base ring smaller in diameter than the said face, an element with fluid passages therethrough and supporting the base ring from and spaced below said part and with the ring guided by said skirt and engageable with the shoulder of the skirt when the face engages the seat of the body, and a sealing ring carried by the valve inward of the said face and engageable with the top of the said body.

4. In combination, a seat element having an annular body with an outer mounting surface at its upper end portion and a seat at its upper end and having a skirt depending from the upper portion, the skirt having openings through it and having an upwardly facing internal shoulder at its lower end, and a valve including, a rigid disc-like part with an outer peripheral face engageable with the seat of the body, a base ring concentric with and spaced below the body and guided by said skirt and engageable with the shoulder of the skirt when the face engages the seat of the body, and a plurality of circumferentially spaced legs rigidly connecting the ring and the said part inward of said outer peripheral face.

5. In combination a seat element including, an annular body with an outer mounting surface and downwardly and inwardly stepped seat portions at its upper end, and a skirt with openings therein and depending from the body and having an inwardly extending lip at its lower end with an upwardly facing shoulder, and a valve element including a rigid disc-like structure with stepped outer peripheral faces simultaneously engageable with the seat portion of the annular body, a base ring guided in the skirt portion of the seat element, and spaced legs depending from said disc-like structure and carrying the ring so it engages said shoulder when said faces engage the seat portions of the annular body.

6. In combination a seat element including, an annular body with an outer mounting surface and downwardly and inwardly stepped seat portions at its upper end, and a skirt with openings therein and depending from the body and having an upwardly facing shoulder at its lower end portion, and a valve element including a rigid disc-like structure with stepped peripheral faces engageable with the seat portions, a sealing ring carried by said structure adjacent one of said faces to cooperate with one of said seat portions of the body, a base ring guided in the skirt portion of the seat element, and spaced legs depending from said structure and carrying the ring so it engages said shoulder when said faces engage the seat portions of the body.

7. In combination a seat element including, an annular body with an outer mounting surface and downwardly and inwardly stepped seat portions at its upper end, and a skirt depending from the body and having openings through it and having an inwardly projecting lip at its lower end with an upwardly facing shoulder, and a valve element including a rigid disc-like structure with stepped peripheral faces engageable with the seat portions, a sealing ring carried by said structure adjacent the outermost of said faces to cooperate with the inner portion of the outermost seat portion, a base ring guided in the skirt portion of the seat element, and spaced legs depending from said structure and carrying the ring so it engages said shoulder when said faces engage the seat portions.

8. A valve including, a rigid main section having a disc-like body with a groove in its periphery and having a continuous annular conically shaped supporting face axially spaced from the groove, a sealing ring having flat parallel top and bottom walls and flat parallel side walls extending between the top and bottom walls, and a rigid cap rigidly secured to the body and having a grooved periphery with a supporting face, the grooves of the body and cap registering to carry the sealing ring with parts of the body and cap engaging all of said walls of the ring leaving a part only of one wall exposed adjacent one of the supporting faces.

9. A valve including, a rigid main section having a disc-like body with a grooved periphery having an uninterrupted annular supporting face, a sealing ring having flat parallel top and bottom walls and flat parallel side walls extending between the top and bottom walls, and a rigid cap secured to the body and having a grooved periphery with a supporting face, the grooves of the body and cap registering to carry the sealing ring with the inner portions of the top and bottom walls tight between opposed parts of the body and cap, there being a recess in the cap above the outer peripheral portion of the sealing ring and passages in the cap admitting fluid to the recess.

10. A valve including, a rigid main section having a disc-like body with an upwardly and outwardly faced groove in its periphery and having an uninterrupted annular supporting face spaced from and located below the groove, a sealing ring having flat parallel top and bottom walls and flat parallel side walls extending between the top and bottom walls, and a rigid cap secured to the body and having a grooved periphery with an uninterrupted annular supporting face, the grooves of the body and cap registering to carry the sealing ring with parts of the body and cap engaging and retaining all walls of the ring and leaving only the outer peripheral portion of the bottom wall of the ring exposed adjacent one of the supporting faces, there being an annular recess in the cap above the outer peripheral portion of the upper surface of the ring and passages in the cap admitting fluid through the cap to the recess.

11. A valve including, a rigid main section having a disc-like body with an upwardly and outwardly opening groove in its periphery and having an uninterrupted annular supporting face spaced from and located below the groove, a sealing ring, and a rigid cap secured to the body and having a downwardly and outwardly opening groove in its periphery with an annular supporting face outward of the groove, the grooves of the body and cap registering to carry the sealing ring, the supporting face of the body being stepped inward and downward from the supporting face of the cap.

RANKIN E. CRAVEN.

References Cited in the file of this patent

UNITED STATES PATENTS

| Number | Name | Date |
|---|---|---|
| 286,742 | Stock | Oct. 16, 1883 |
| 694,773 | Morris | Mar. 4, 1902 |
| 772,434 | Schoultz | Oct. 18, 1904 |
| 1,163,236 | Holzer | Dec. 7, 1915 |
| 1,193,849 | Viger | Aug. 8, 1916 |
| 1,327,564 | McDougall | Jan. 6, 1920 |
| 1,409,393 | Monsarrat | Mar. 14, 1922 |
| 1,654,772 | Akeyson | Jan. 3, 1928 |
| 1,686,849 | Frauenheim | Oct. 9, 1928 |
| 1,705,800 | Akeyson | Mar. 19, 1929 |
| 1,714,740 | Timbs | May 28, 1929 |
| 1,716,896 | Miller | June 11, 1929 |
| 1,844,159 | Hamer | Feb. 9, 1932 |
| 1,975,454 | Frye | Oct. 2, 1934 |
| 1,983,797 | Greve | Dec. 11, 1934 |
| 2,011,740 | Vallendor et al. | Aug. 20, 1935 |
| 2,107,200 | Kennon | Feb. 1, 1938 |
| 2,271,137 | Hamer | Jan. 27, 1942 |